(12) United States Patent
Tokuchi

(10) Patent No.: US 11,893,848 B2
(45) Date of Patent: Feb. 6, 2024

(54) BOOTH, INFORMATION PROCESSING SYSTEM, AND NON-TRANSITORY COMPUTER READABLE MEDIUM

(71) Applicant: FUJI Business Innovation Corp., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/149,735

(22) Filed: Jan. 15, 2021

(65) Prior Publication Data
US 2022/0036677 A1    Feb. 3, 2022

(30) Foreign Application Priority Data

Jul. 30, 2020   (JP) ................................. 2020-129440

(51) Int. Cl.
*G07C 9/20*  (2020.01)
*G07C 9/00*  (2020.01)
*G06Q 10/02* (2012.01)

(52) U.S. Cl.
CPC ............. *G07C 9/215* (2020.01); *G06Q 10/02* (2013.01); *G07C 9/00904* (2013.01); *G07C 9/00912* (2013.01)

(58) Field of Classification Search
CPC ...... G07C 9/215; G07C 9/00904; G07C 9/23; G07C 9/253; G07C 2209/08; G07C 2209/62; G07C 9/00912; G07C 9/00309; G06Q 10/02; G06Q 50/12; G08B 21/24

USPC ............................. 340/5.28, 4.6, 4.61, 4.62
See application file for complete search history.

(56) References Cited

U.S. PATENT DOCUMENTS

| | | | | |
|---|---|---|---|---|
| 5,638,646 A | * | 6/1997 | Shane ................. | G07F 17/0014 52/36.2 |
| 11,182,994 B2 | * | 11/2021 | Funo .................. | G07C 9/00571 |
| 2002/0195878 A1 | * | 12/2002 | Willats .................... | E05B 77/48 307/10.2 |
| 2007/0216517 A1 | * | 9/2007 | Kurpinski ............. | B60R 25/245 340/8.1 |
| 2007/0241927 A1 | * | 10/2007 | Ratnakar .............. | G06Q 10/025 244/118.6 |
| 2011/0093928 A1 | * | 4/2011 | Nakagawa ......... | G06Q 10/1097 726/4 |
| 2013/0176107 A1 | * | 7/2013 | Dumas ............... | G07C 9/00571 340/5.61 |
| 2015/0179012 A1 | * | 6/2015 | Sharpe ............. | G06Q 10/06314 340/5.28 |
| 2015/0339870 A1 | * | 11/2015 | Cojocaru ................. | G07C 9/22 340/5.53 |
| 2015/0348179 A1 | * | 12/2015 | Kamisawa ............. | G08G 1/205 705/5 |
| 2016/0371535 A1 | * | 12/2016 | Li ........................ | G06V 40/172 |
| 2017/0142581 A1 | * | 5/2017 | Tarmey .............. | G07C 9/00563 |

(Continued)

FOREIGN PATENT DOCUMENTS

| | | |
|---|---|---|
| JP | 2015-219812 | 12/2015 |
| JP | 2017-214702 | 12/2017 |
| JP | 2019-190198 | 10/2019 |

*Primary Examiner* — Vernal U Brown
(74) *Attorney, Agent, or Firm* — JCIPRNET

(57) ABSTRACT

A booth includes an openable door and a locking mechanism that locks the door. The door is locked in a case where the door is closed, and the door is not locked in a case where a predetermined condition is satisfied.

13 Claims, 18 Drawing Sheets

(56) References Cited

U.S. PATENT DOCUMENTS

2019/0177993 A1\* 6/2019 Shell ...................... E04H 1/125
2021/0067969 A1\* 3/2021 Stern ................... H04W 64/003

\* cited by examiner

FIG. 9

| RESERVATION PERIOD | LOCATION | ENTERED | CURRENTLY OCCUPIED | USER TERMINAL PRESENT | NOTE |
|---|---|---|---|---|---|
| 5/17/2018 RESERVED 9:00-10:00 | A | YES | NO | YES ← 10A | |

PLEASE TAKE YOUR
SMARTPHONE WITH YOU
WHEN YOU EXIT THE BOOTH.

US 11,893,848 B2

BOOTH, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-129440 filed Jul. 30, 2020.

BACKGROUND

(i) Technical Field

The present disclosure relates to a booth, an information processing system, and a non-transitory computer readable medium.

(ii) Related Art

Japanese Unexamined Patent Application Publication No. 2019-190198 discloses an electronic key reissuing program that reissues a shared key having an unlocking right that unlocks an electric lock of a room reserved by a user, the shared key being reissued when a reservation confirmation is performed again in a reservation confirming means.

Japanese Unexamined Patent Application Publication No. 2015-219812 discloses a process in which an abnormality inside a private room is displayed on a display when a human sensor senses or does not sense a person inside the private room for a set length of time or longer while a door sensor is operating.

Japanese Unexamined Patent Application Publication No. 2017-214702 discloses a configuration in which a wireless communication circuit and a keypad are built into a door knob, the keypad is used to input a passcode for unlocking the door temporarily, and by transmitting the passcode from the door knob to a key management server owned by a housing manager, the door is unlocked.

SUMMARY

A booth that a user enters and exits is conceivably provided with a door, and may be configured such that the user enters and exists the booth through the door. Here, in a configuration in which the door of the booth is locked automatically, a situation may occur in which the door is locked automatically when the user exits the booth, and the user is no longer able to re-enter the booth.

Aspects of non-limiting embodiments of the present disclosure relate to improving the convenience of entering and exiting a booth provided with a locking mechanism that locks a door automatically.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a booth including an openable door and a locking mechanism that locks the door. The door is locked in a case where the door is closed, and the door is not locked in a case where a predetermined condition is satisfied.

BRIEF DESCRIPTION OF THE DRAWINGS

Exemplary embodiments of the present disclosure will be described in detail based on the following figures, wherein:

FIG. 9 is a diagram illustrating information stored in an information database (DB) provided in the space management server;

FIG. 15 is a diagram illustrating a display example on a monitor;

DETAILED DESCRIPTION

Hereinafter, exemplary embodiments of the present disclosure will be described with reference to the drawings.

Figure 1:
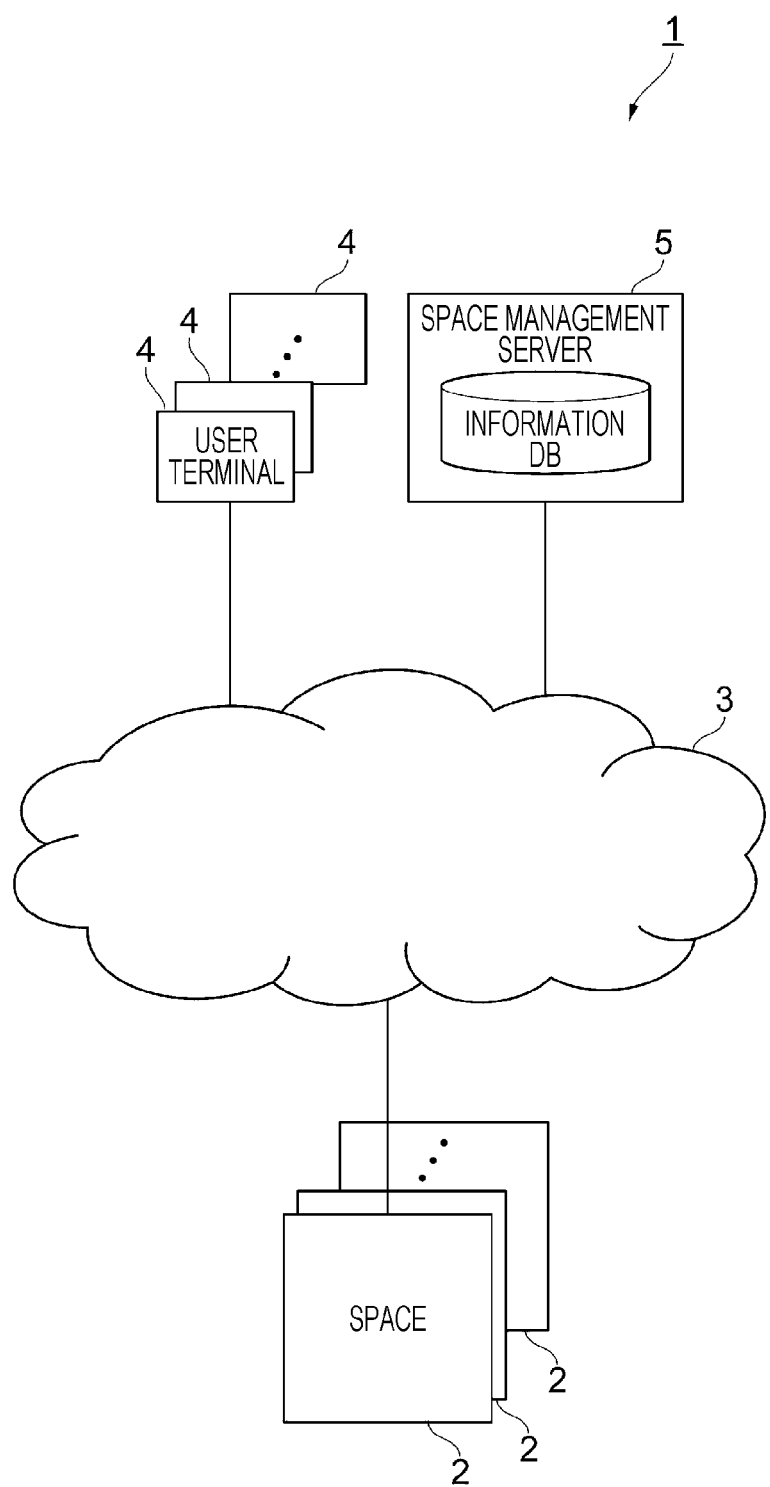
FIG. 1 is a diagram schematically illustrating an overall configuration of an information processing system.

FIG. 1 is a diagram schematically illustrating an overall configuration of an information processing system 1 according to the exemplary embodiment.

In the exemplary embodiment, a plurality of spaces 2 are provided as an example of places that are reserved for use by users.

In the exemplary embodiment, each of the spaces 2 is reservable, and a user is able to use a certain space 2 by reserving the space 2 in advance.

The spaces 2 may be booths, guest rooms in a lodging facility, conference rooms in a company office, or the like. These are examples of spaces 2 that are divided from the surroundings by walls, partitions, or the like.

Also, the spaces 2 in the exemplary embodiment include spaces such as tables or seats for receiving services provided at a facility such as a restaurant or a barber shop. These are examples of spaces 2 that are open to the surroundings.

The information processing system 1 illustrated in FIG. 1 includes various terminals connected to a cloud network 3.

Figure 3:
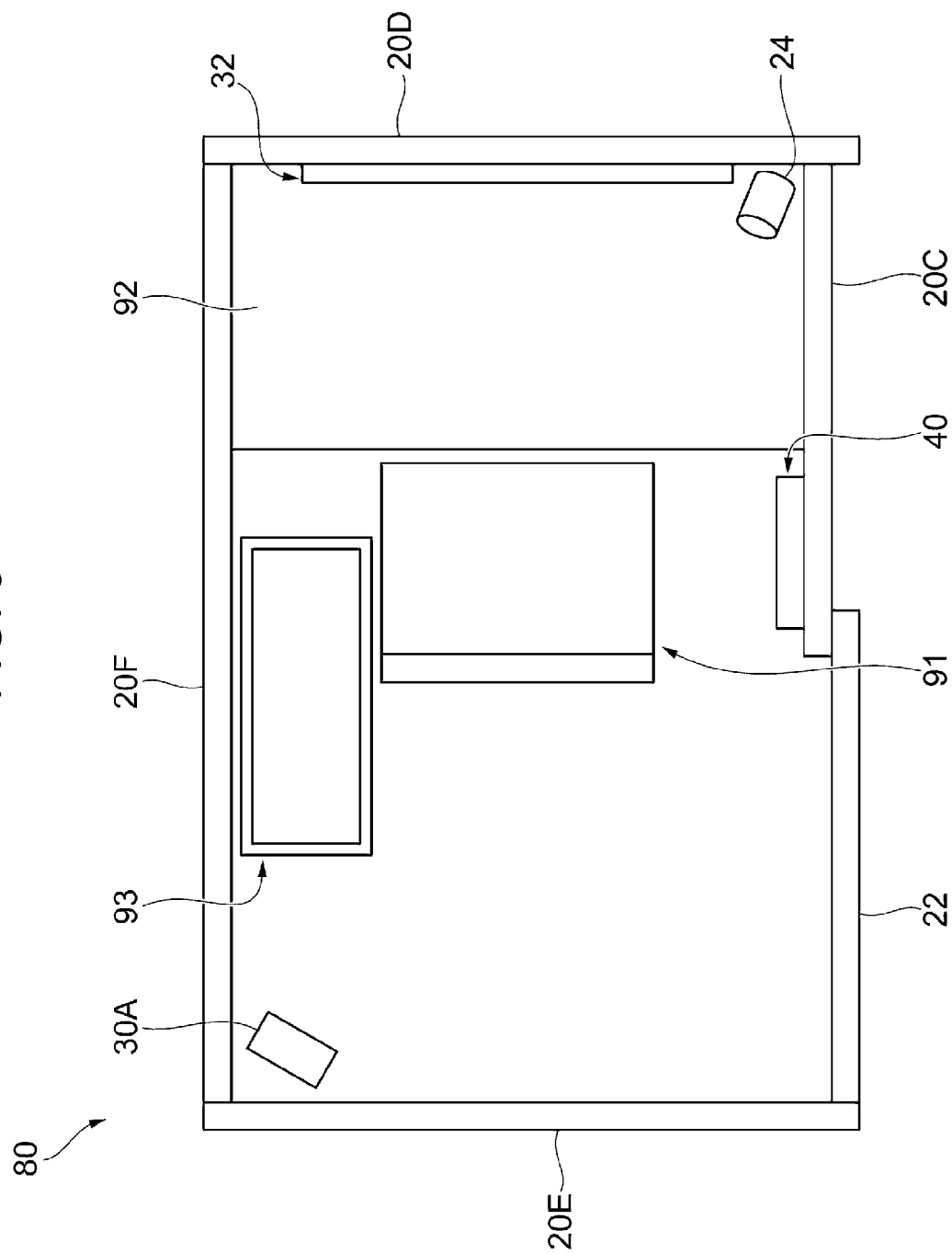
FIG. 3 is a diagram for explaining the interior of the booth.

In FIG. 3, user terminals 4 operated by users and a space management server 5 that manages the spaces 2 are illustrated as examples of the terminals connected to the cloud network 3.

The spaces 2 are also connected to the cloud network 3. More specifically, various equipment is provided in the spaces 2, and the equipment is connected to the cloud network 3.

In the exemplary embodiment, the doors of the spaces 2 are fitted with an electronic lock, and each space 2 is lockable. In the exemplary embodiment, a person who has an unlocking right for a certain space 2 is able to use the space 2.

To unlock the space 2, the unlocking person operates his or her own user terminal 4 to give an unlock instruction. The instruction is transmitted to the space management server 5, and the space management server 5 receives the instruction. Thereafter, the space management server 5 issues an instruction to unlock the space 2 specified by the unlock instruction. With this arrangement, the electronic lock installed in the space 2 is activated, and the space 2 is unlocked.

In other words, in the exemplary embodiment, the space 2 is unlocked in the case where there is an instruction from the user terminal 4, which is an example of portable equipment carried by a user.

In the exemplary embodiment, a portable smartphone is anticipated as the user terminal 4. However, the portable user terminal 4 may also be what is called a wearable terminal, and may also be a laptop computer or a game console.

The space management server 5 manages various information related to the spaces 2. The space management server 5 is provided with an information database (DB). The information DB is achieved by an information recording device such as a hard disk drive 102 described later.

The information DB stores various information, such as information related to reservations of the spaces 2 and information indicating the internal states of the spaces 2.

The space management server 5 manages information that specifies users, information that specifies the spaces 2 available for reservation, the start dates and times of reservations, and the end dates and times of reservations, for example.

The information that specifies users includes the name, gender, and age of each user, an account, a user ID, a password, and individually-assigned management information for each user. Also, the information that specifies the spaces 2 available for reservation includes information that specifies the address or space where each space 2 is located for example, and a name or number used for management.

In addition, the space management server 5 also functions as a control device that controls the various equipment installed in the spaces 2.

Note that a control device may also be installed in each space 2 in correspondence with each of the spaces 2. In this case, the control device installed in each space 2 controls the various equipment installed in each space 2.

<Exterior Configuration of Space 2>

Figure 2:
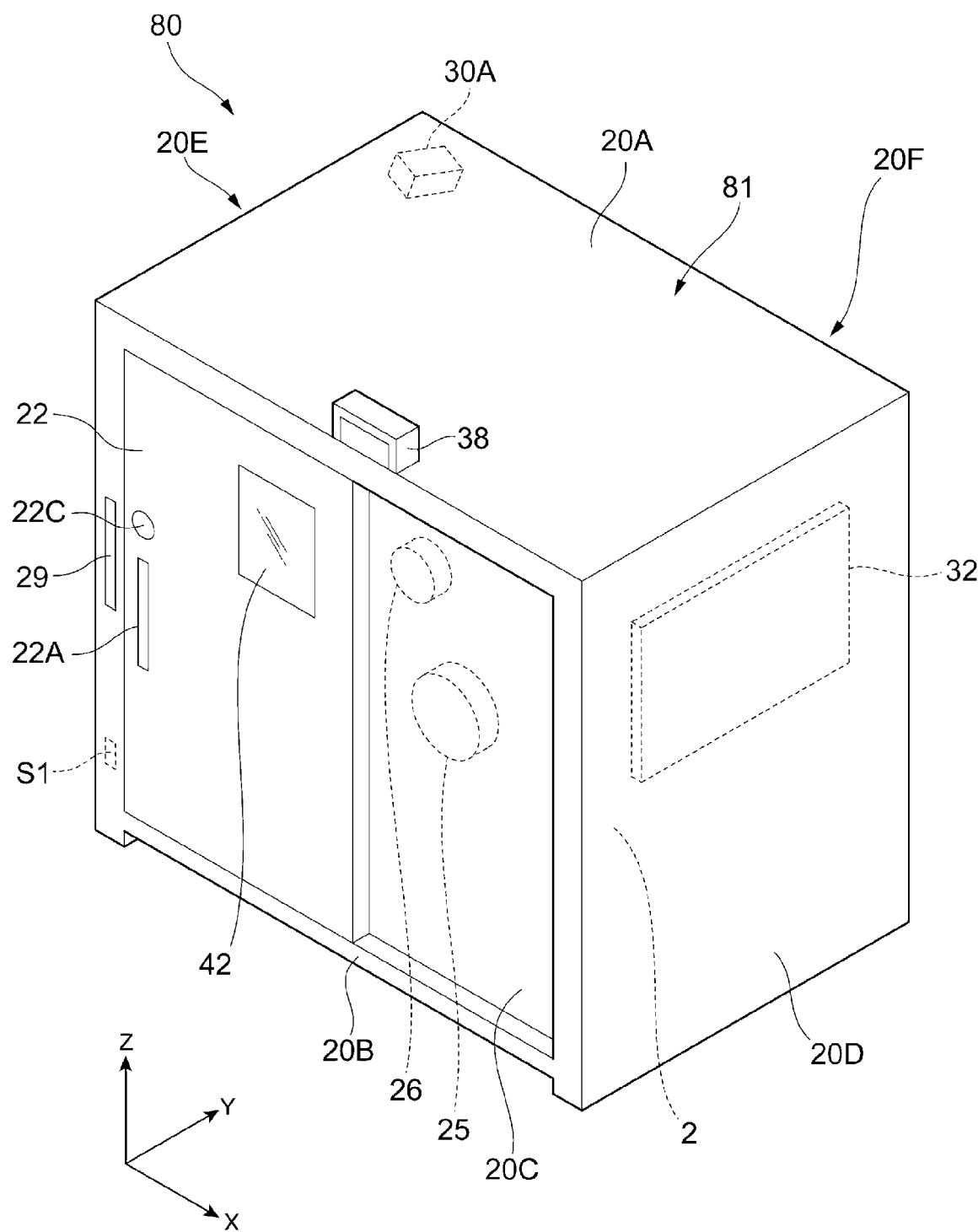
FIG. 2 is a diagram illustrating a booth.

FIG. 2 is a diagram illustrating a booth 80.

In the example illustrated in FIG. 2, the interior of the booth 80 is the space 2, and in the exemplary embodiment, the space 2 in the interior of the booth 80 is available for reservation.

The booth 80 in the exemplary embodiment is installed indoors or outdoors in any of various locations, including inside a train or subway station, an airport, an office building, a commercial facility such as a restaurant or a department store, a bank, a library, an art gallery, a museum, a public institution or facility, a passageway, or a park.

The booth 80 illustrated in FIG. 2 is an enclosed booth 80 with a ceiling.

Here, "enclosed" does not mean sealed, but refers to a state that achieves a practical level of soundproofing.

Also, the "booth 80" refers to a structure having partitions that partition the space 2 from other spaces positioned around the space 2. Here, the partitions do not necessarily exist on all four sides of the space 2, and even a structure that partially lacks partitions may still correspond to the booth 80.

Furthermore, the ceiling does not have to be provided, and even a structure that lacks a ceiling may still correspond to the booth 80.

The booth 80 illustrated in FIG. 2 is provided with a frame 81 that forms a major part of the booth 80. The frame 81 is formed in a cuboid shape.

The booth 80 is provided with a ceiling 20A, a floor 20B, a wall 20C having an openable door 22 attached, two walls 20D and 20E positioned on either side of the wall 20C, and a wall 20F positioned on the opposite side from the door 22.

In the exemplary embodiment, the space 2 is surrounded by the wall 20C, the door 22, the wall 20D, the wall 20E, and the wall 20F, such that the space 2 is provided on the inner side of the four walls and the door 22.

In other words, in the exemplary embodiment, the space 2 is provided on the inner side of the frame 81.

In the exemplary embodiment, the door 22 is anticipated to be a sliding door that is movable parallel to the wall 20C. In the case of FIG. 2, the door 22 is a single sliding door that slides in one direction, but the door 22 may also be a bypass door that opens by sliding two or more panels past each other, a double-sliding door in which two panels slide away from each other, a hinged door, or a folding door.

A handle 22A that the user grasps when opening and closing the door 22 is attached to the door 22. Note that the handle 22A may also be provided on the inner side of the door 22.

Additionally, an electronic lock 22C that serves as an example of a locking mechanism and an unlocking mechanism capable of locking and unlocking the door 22 is attached to the door 22. One example of the electronic lock 22C is an electromagnetic lock that controls a deadbolt and a cylinder thumb-turn that lock the door 22.

Figure 10:
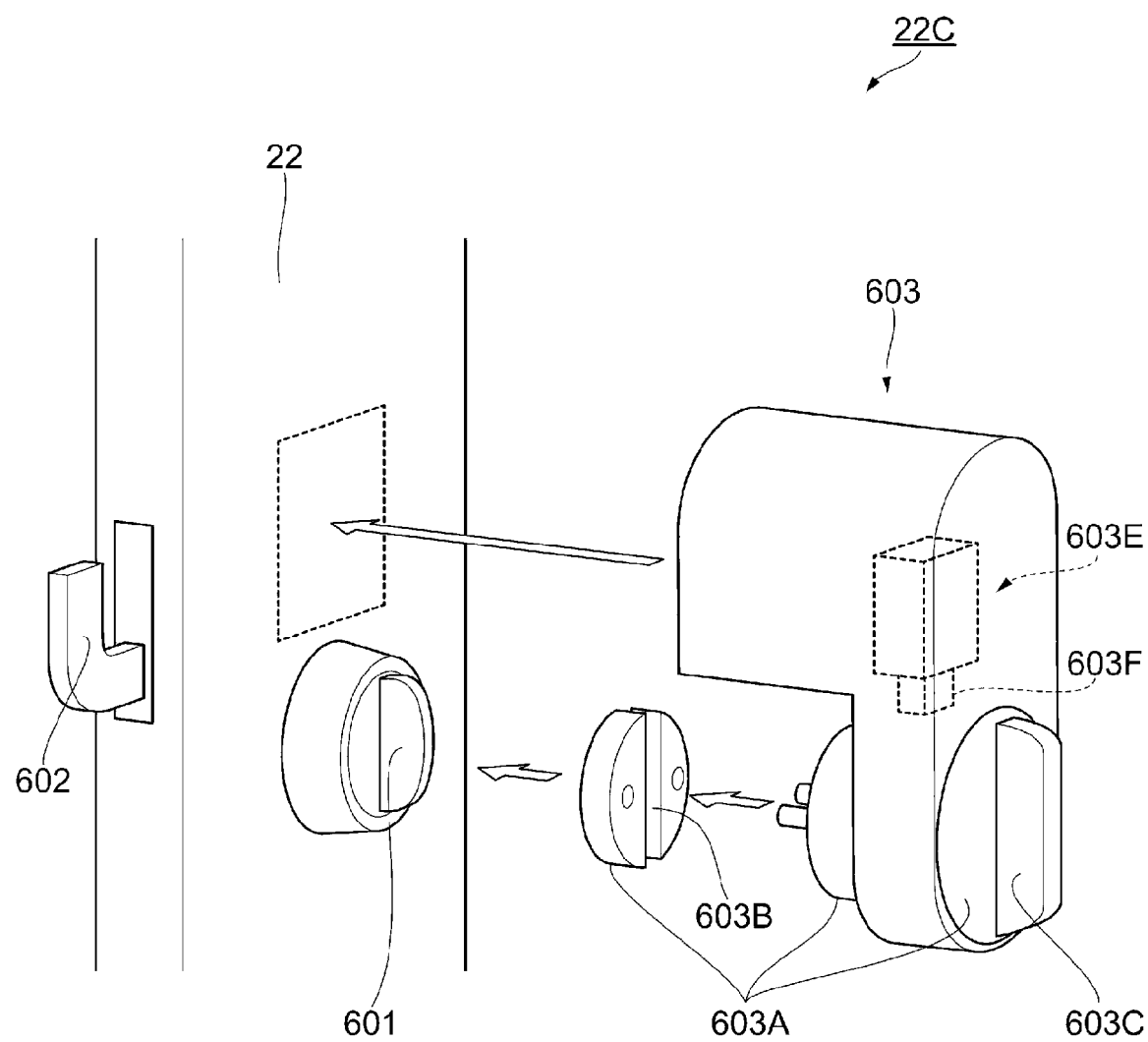
FIG. 10 is a diagram illustrating an example of an electronic lock.

FIG. 10 is a diagram illustrating an example of the electronic lock 22.

The electronic lock 22C is provided with a thumb-turn 601 and a hook-shaped deadbolt 602 that moves together with the thumb-turn 601. Also, on the frame 81 (see FIG. 2) side, a hole (not illustrated) that accepts the deadbolt 602 is provided.

In the exemplary embodiment, the door 22 is locked by causing the deadbolt 602 to slide into the hole. More specifically, even if someone attempts to open the door 22, the deadbolt 602 catches on the frame 81 and the door 22 does not open.

Furthermore, the electronic lock 22C is provided with a rotation mechanism 603 that rotates the thumb-turn 601. A motor (not illustrated) is installed inside the rotation mechanism 603, and additionally, a rotating body 603A having a groove 603B that accepts the thumb-turn 601 is provided in the rotation mechanism 603. In the exemplary embodiment, the rotating body 603A is rotated by the rotation mechanism 603, thereby causing the thumb-turn 601 to turn and lock or unlock the electronic lock 22C.

The rotating body 603A is provided with an inside key 603C. In the exemplary embodiment, when the user turns the inside key 603C, the rotating body 603A rotates and unlocks the electronic lock 22C. In the exemplary embodiment, the user is able to unlock the electronic lock 22C manually on the inner side of the door 22.

Furthermore, in the exemplary embodiment, a lock mechanism 603E that regulates the rotation of the rotating body 603A and allows the inside key 603C to be operated is provided inside the rotation mechanism 603. Furthermore, in the exemplary embodiment, a projecting part (not illustrated) that projects out from the outer circumferential surface of the rotating body 603A is provided at the part of the rotating body 603A facing the lock mechanism 603E.

The lock mechanism 603E is provided with a retracting member 603F that projects out into the movement path of the projecting part. In the exemplary embodiment, by causing the retracting member 603F to project out into the movement path, the rotation of the rotating body 603A is restricted, making the inside key 603C inoperable.

Also, by causing the retracting member 603F to retract from the movement path of the projecting part, the rotating body 603A is rotatable, making the inside key 603C operable.

Note that the rotation mechanism 603 portion of the electronic lock 22C may be retrofitted onto the door 22, or instead of retrofitting, the electronic lock 22C may be configured as a single unit combining the thumb-turn 601 and the rotation mechanism 603 portion from the beginning.

Figure 11:
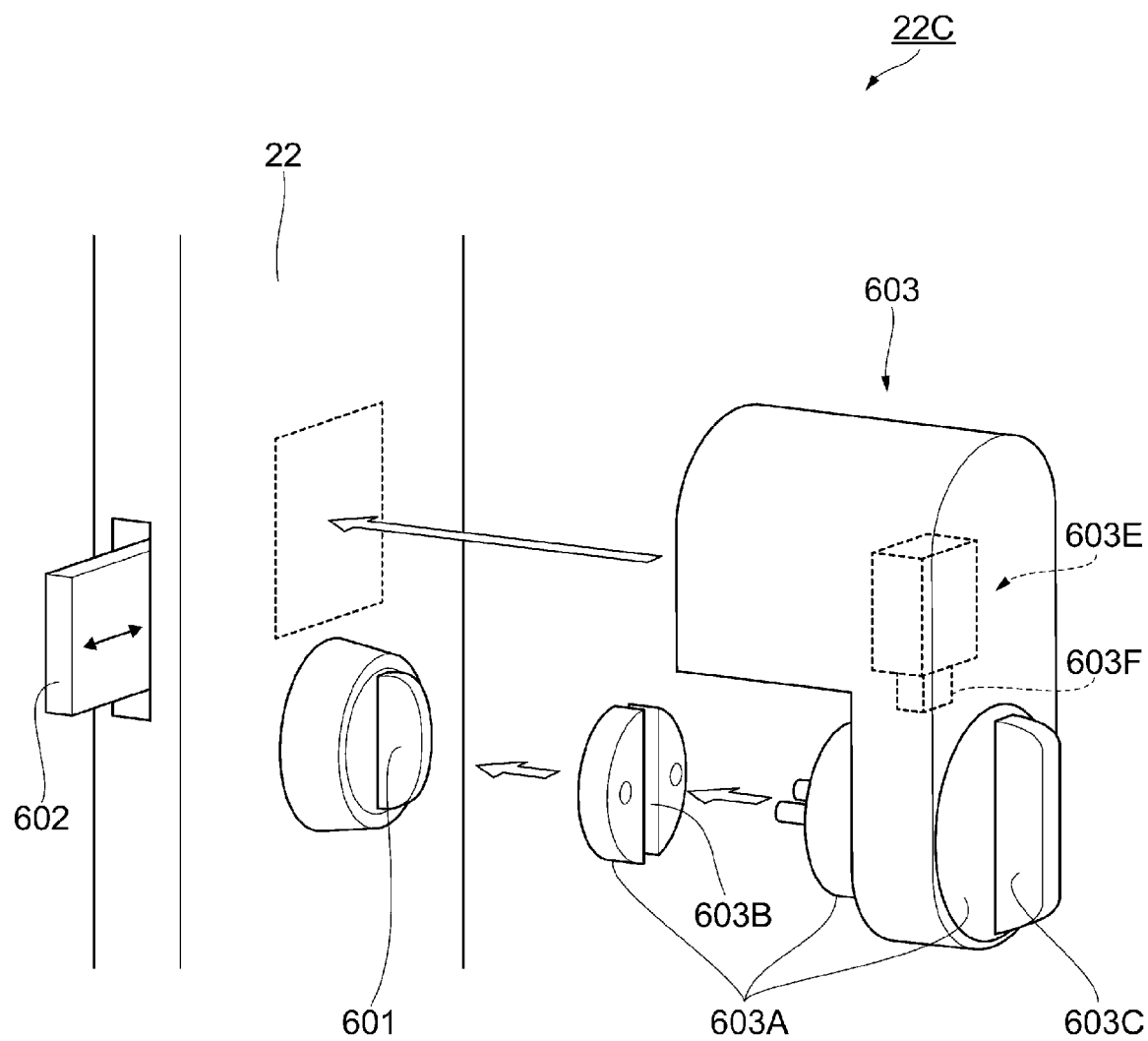
FIG. 11 is a diagram illustrating another exemplary configuration of the electronic lock.

Note that although FIG. 10 illustrates an example of what is called a hook-shaped deadbolt 602, the door 22 may be a different type of door than the sliding door like the exemplary embodiment, such as a hinged door for example, and in such a case, a deadbolt 602 that advances and retreats linearly is used, as illustrated in FIG. 11 (a diagram illustrating another exemplary configuration of the electronic lock 22C).

Also, the shape of the deadbolt 602 is not particularly limited, and an existing deadbolt 602 may be selected with consideration for the shape of the door 22 and the way in which the door 22 opens.

Figure 12:
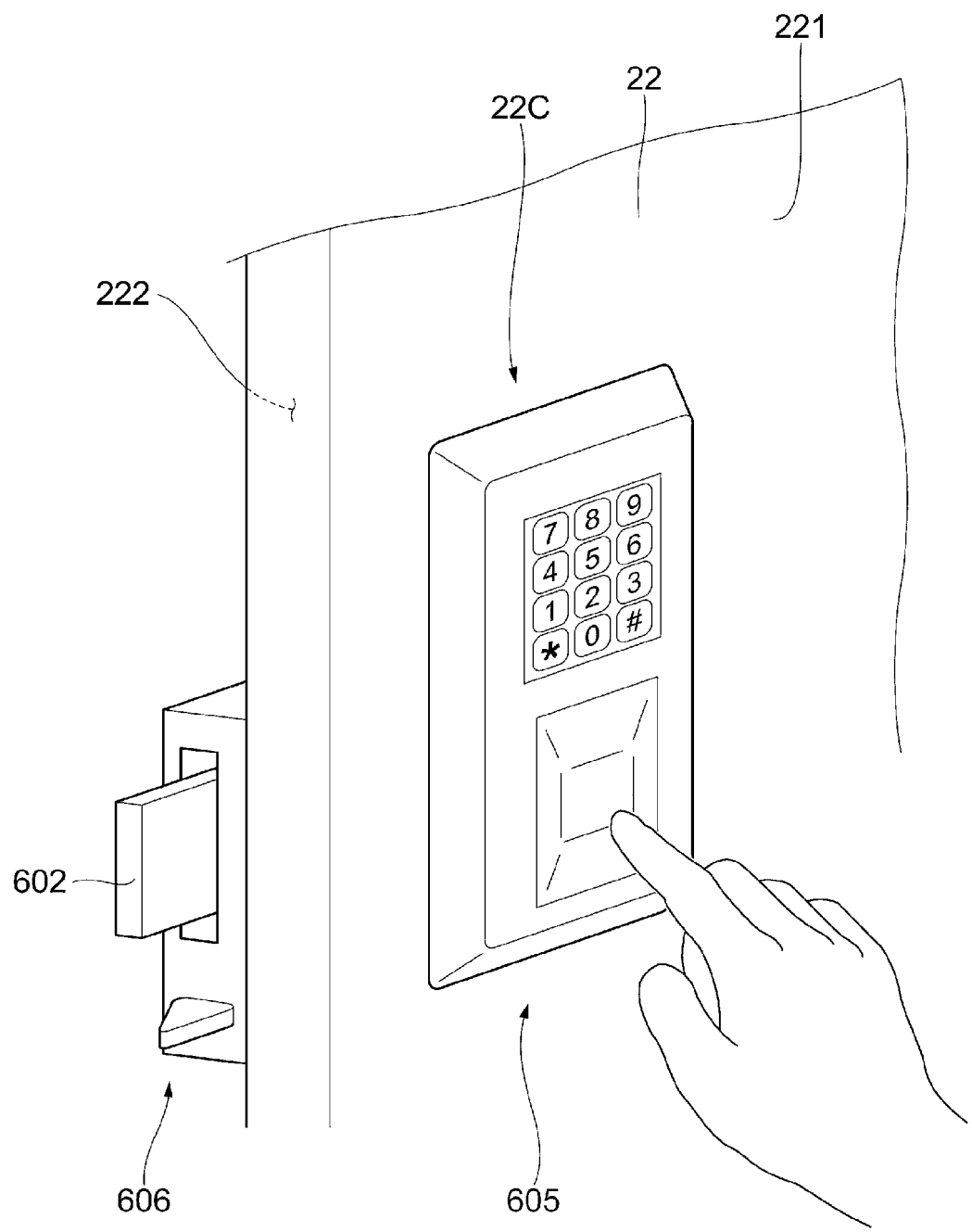
FIG. 12 is a diagram illustrating another exemplary configuration of the electronic lock.

Otherwise, an electronic lock like the one illustrated in FIG. 12 (a diagram illustrating another exemplary configuration of the electronic lock 22C) may be used as the electronic lock 22C. The electronic lock 22C illustrated in FIG. 12 is provided with a panel 605 mounted on an outer face 221 of the door 22 and a driving part 606 mounted on an inner face 222 of the door 22.

With this electronic lock 22C, the user is able to input a password into the panel 605, and if the input password matches a preregistered password, the deadbolt 602 provided in the driving part 606 is retracted, and the electronic lock 22C is unlocked.

This electronic lock 22C is also capable of acquiring the user's fingerprint, and if an acquired fingerprint matches a preregistered fingerprint, the deadbolt 602 likewise retracts and the electronic lock 22C is unlocked.

Furthermore, in the exemplary embodiment, an open/close sensor S1 that detects the opening and closing of the door 22 is provided, as illustrated in FIG. 2.

The number of persons able to use the booth 80 is roughly determined according to the volume of the booth 80. The booth 80 in the exemplary embodiment is basically anticipated to be a personal space used by a single person. However, the booth 80 may also be a large booth 80 capable of accommodating many people.

Note that a personal space does not mean a space that is usable only by a single person, but is instead used to refer to a space usable by a small number of people, such as two to three people for example.

Furthermore, the frame 81 forming the booth 80 may have any shape or structure, and the equipment provided in the booth 80 may be of any type and capability.

FIG. 3 is a diagram for explaining the interior of the booth 80. Note that FIG. 3 illustrates a state of looking at the booth 80 from above.

In the exemplary embodiment, a desk 92 and a chair 91 are placed inside the booth 80.

A baggage container 93 into which the user places his or her belongings is also installed inside the booth 80. In other words, a baggage container 93 that holds the user's belongings that have been placed therein is provided inside the booth 80.

Also, a monitor 32, which is a display device for displaying video, is provided as furnished equipment inside the booth 80, as illustrated in FIGS. 2 and 3.

Also, a speaker 30A, which is a sound output device that outputs sound, is provided in the exemplary embodiment, as illustrated in FIGS. 2 and 3. Note that the speaker 30A does not have to be provided separately, and sound may also be output from a speaker built into the monitor 32.

Also, an interior imaging device 24, which is an imaging device that takes images of the interior of the booth 80, is provided in the exemplary embodiment, as illustrated in FIG. 3. Also, an exterior imaging device 38, which is an imaging device that takes images of the exterior of the booth 80, is provided in the exemplary embodiment, as illustrated in FIG. 2.

The interior imaging device 24 and the exterior imaging device 38 are each provided with an image sensor such as a CCD or CMOS sensor. The interior imaging device 24 and the exterior imaging device 38 each use the image sensor to take images.

Also, as illustrated in FIG. 2, the booth 80 is provided with a human sensor 25 that detects the user or users inside the booth 80. Also, in the exemplary embodiment, a temperature sensor 26 that detects the temperature inside the booth 80 is provided.

Also, as illustrated in FIG. 3, lighting equipment 40 for lighting the interior of the booth 80 is provided inside the booth 80.

Furthermore, in the exemplary embodiment, a window 42 is installed in the door 22, as illustrated in FIG. 2. In the exemplary embodiment, the interior of the space 2 is visible through the window 42 from the outside of the space 2.

Furthermore, as illustrated in FIG. 2, an information acquisition device 29 for acquiring individual information about each user who uses the booth 80 is provided on the outer surface of the booth 80.

The information acquisition device 29 includes a reader that reads an ID card held up to the reader, for example. Otherwise, the information acquisition device 29 may be a reader or the like that acquires information such as a user's fingerprint or vein pattern.

Figure 4:
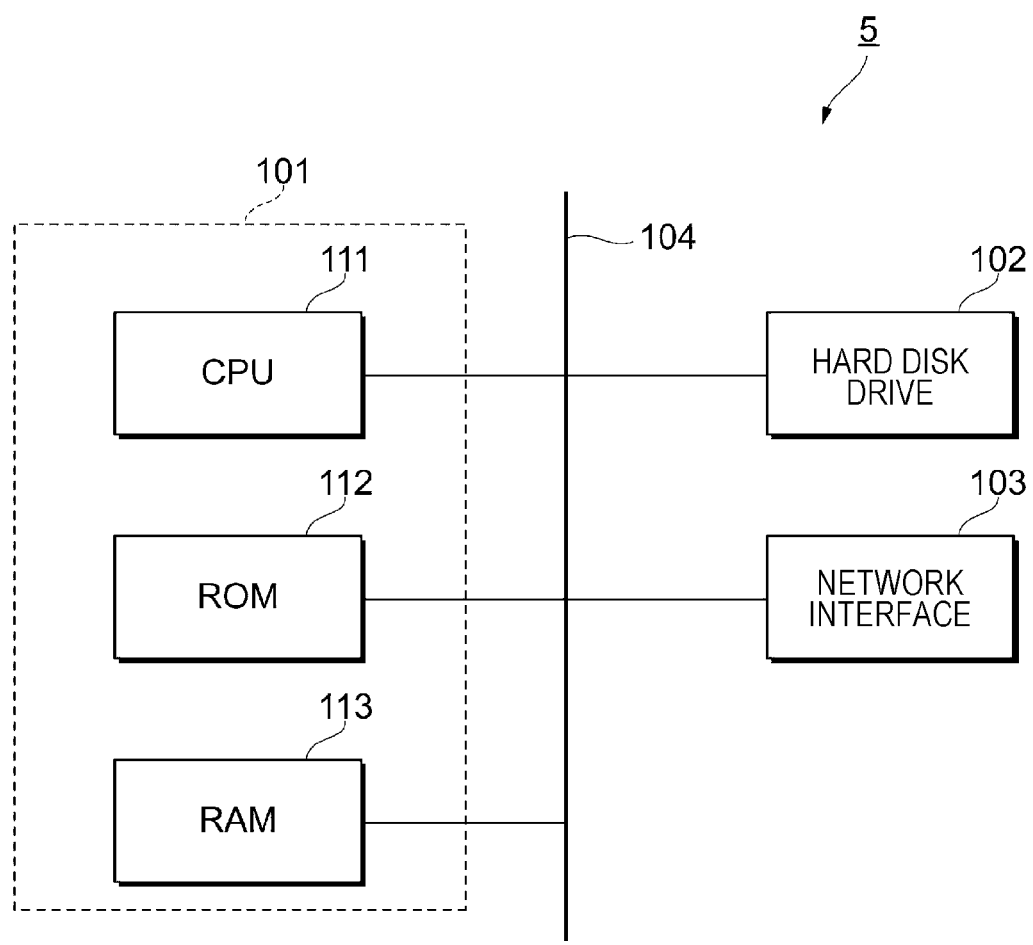
FIG. 4 is a diagram for explaining an example of a hardware configuration of a space management server.

FIG. 4 is a diagram for explaining an example of a hardware configuration of the space management server 5.

The space management server 5 acts as one example of an information processing device, and includes a control unit 101 that controls the operations of the overall device, a hard disk drive 102 that stores management data and the like, and a network interface 103 that achieves communication through a local area network (LAN) cable or the like.

The control unit 101 includes a central processing unit (CPU) 111 as one example of a processor, read-only memory (ROM) 112 storing data such as low-level software and a basic input-output system (BIOS), and random access memory (RAM) 113 that is used as a work area.

The CPU 111 may also be multi-core. Additionally, the ROM 112 may be rewritable non-volatile semiconductor memory. The control unit 101 may also be referred to as a computer.

The hard disk drive 102 is a device that reads and writes data with respect to a non-volatile storage medium in which the surface of a disk-shaped substrate is coated with a magnetic substance. Obviously, the non-volatile storage medium may also be semiconductor memory or magnetic tape.

Besides the above, the space management server 5 is also provided with an input device such as a keyboard or mouse and a display device such as a liquid crystal display as appropriate.

The control unit 101, the hard disk drive 102, and the network interface 103 are connected by a bus 104 and through signal lines not illustrated.

Here, a program executed by the CPU 111 may be provided to the space management server 5 in a recorded state on a computer-readable recording medium, such as a magnetic recording medium (such as magnetic tape or a magnetic disk), an optical recording medium (such as an optical disc), a magneto-optical recording medium, or semiconductor memory. Additionally, a program executed by the CPU 111 may also be provided to the space management server 5 using a communication medium such as the Internet.

Note that in the exemplary embodiment, the term "processor" refers to hardware in a broad sense. Examples of the processor include general processors (e.g., CPU: Central Processing Unit), dedicated processors (e.g., GPU: Graphics Processing Unit, ASIC: Application Integrated Circuit, FPGA: Field Programmable Gate Array, and programmable logic device).

Also, the term "processor" is broad enough to encompass one processor or plural processors in collaboration which are located physically apart from each other but may work cooperatively. The order of operations of the processor is not limited to one described in the exemplary embodiment, and may be changed.

Figure 5:
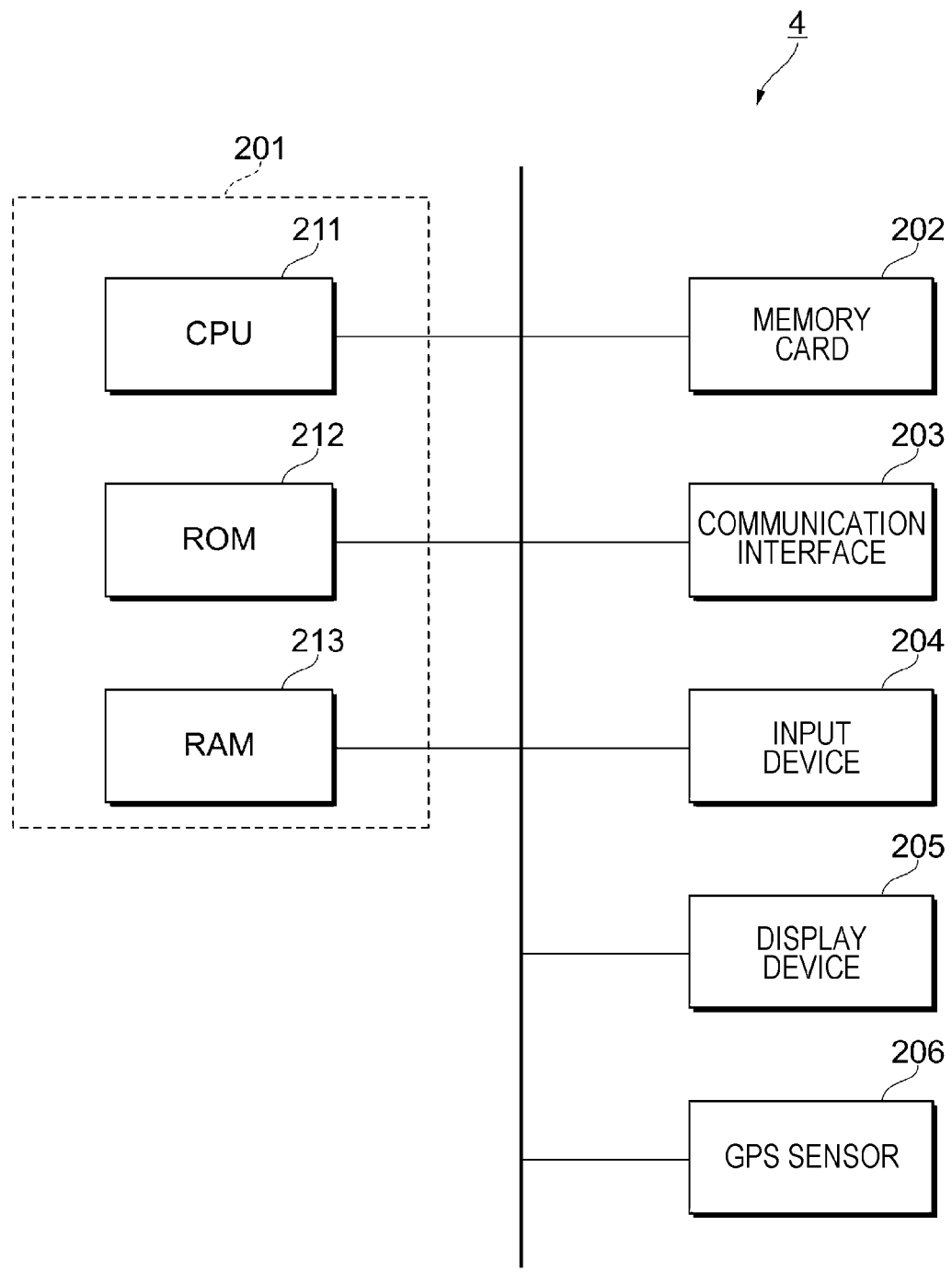
FIG. 5 is a diagram illustrating an example of a hardware configuration of a user terminal.

FIG. 5 is a diagram illustrating an example of a hardware configuration of the user terminal 4. The configuration illustrated in FIG. 5 anticipates the case where the user terminal 4 is a smartphone.

The user terminal 4 includes a control unit 201 that controls the operations of the overall device, a memory card 202 that stores various data, any of various types of communication interfaces 203 that conform to wireless communication standards, an input device 204 such as a touch sensor, a display device 205 such as a liquid crystal display or an organic electroluminescence (EL) display, and a Global Positioning System (GPS) sensor 206.

The control unit 201 includes a CPU 211, ROM 212 storing data such as firmware and a BIOS, and RAM 213 that is used as a work area. The CPU 211 may also be multi-core. Additionally, the ROM 212 may be rewritable non-volatile semiconductor memory.

The communication interfaces 203 include an interface used to connect to a mobile communication system and an interface used to connect to a wireless LAN, for example.

The GPS sensor 206 is a sensor that receives radio waves from GPS satellites to measure the position of the user terminal 4. Latitude, longitude, and altitude information output from the GPS sensor 206 gives the current position of the user terminal 4. Note that the GPS sensor 206 may also support a positioning system for indoor use.

Figure 6:
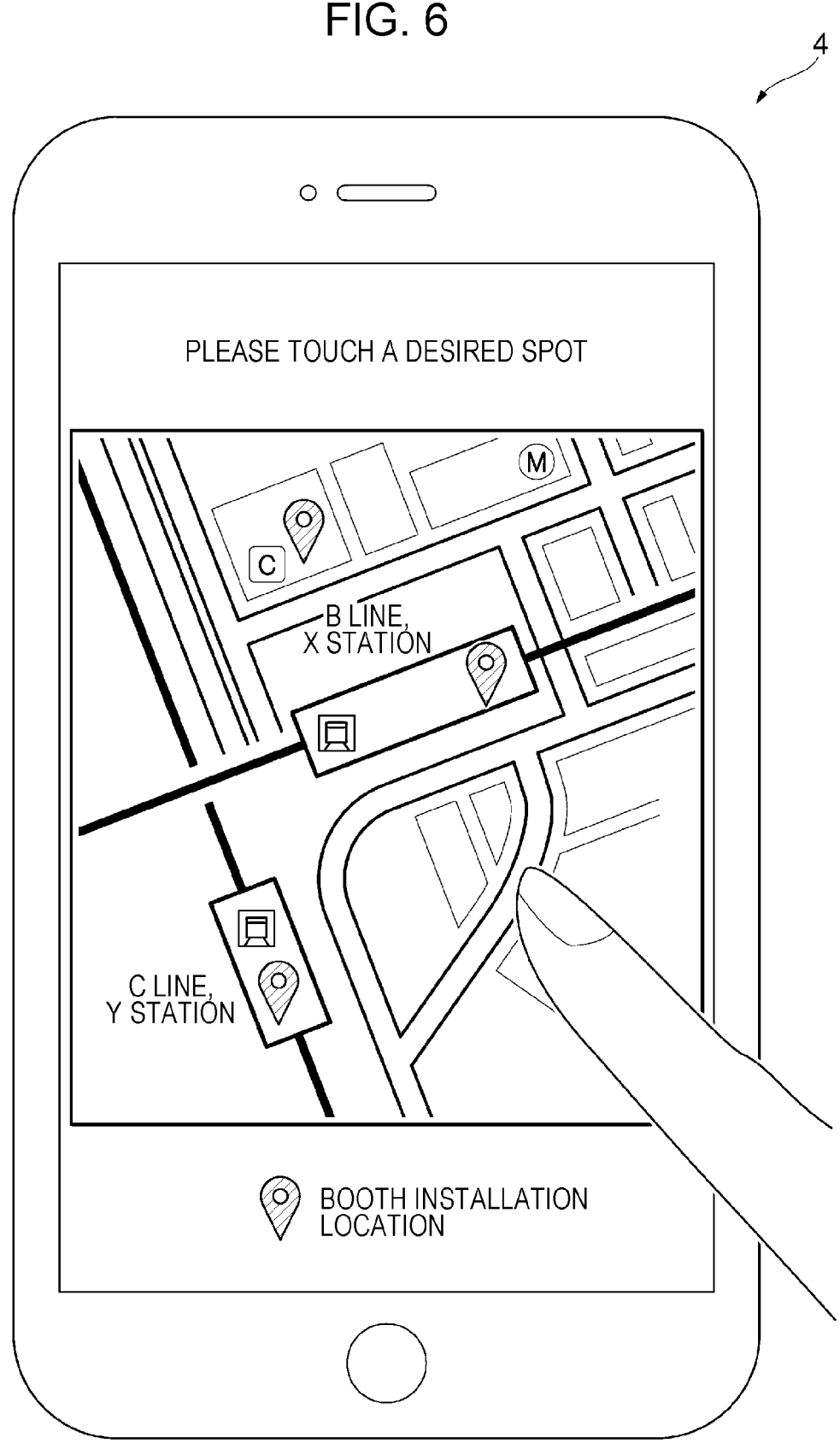
FIG. 6 is a diagram illustrating an example of a display screen displayed on the user terminal of a user of a booth when the user reserves a booth.

FIG. 6 is a diagram illustrating an example of a display screen displayed on the user terminal 4 of a user of a booth 80 when the user reserves the booth 80.

On the display screen illustrated in FIG. 6, a map is displayed, and multiple installation locations of the booths 80 are displayed on the map.

In the exemplary embodiment, when a user of a booth 80 reserves a booth 80, first, the user selects an installation location from among the multiple displayed installation locations.

Note that the display is not limited to such an appearance. For example, multiple installation locations may also be displayed in a list format, and the user may select an installation location from the list.

Figure 7:
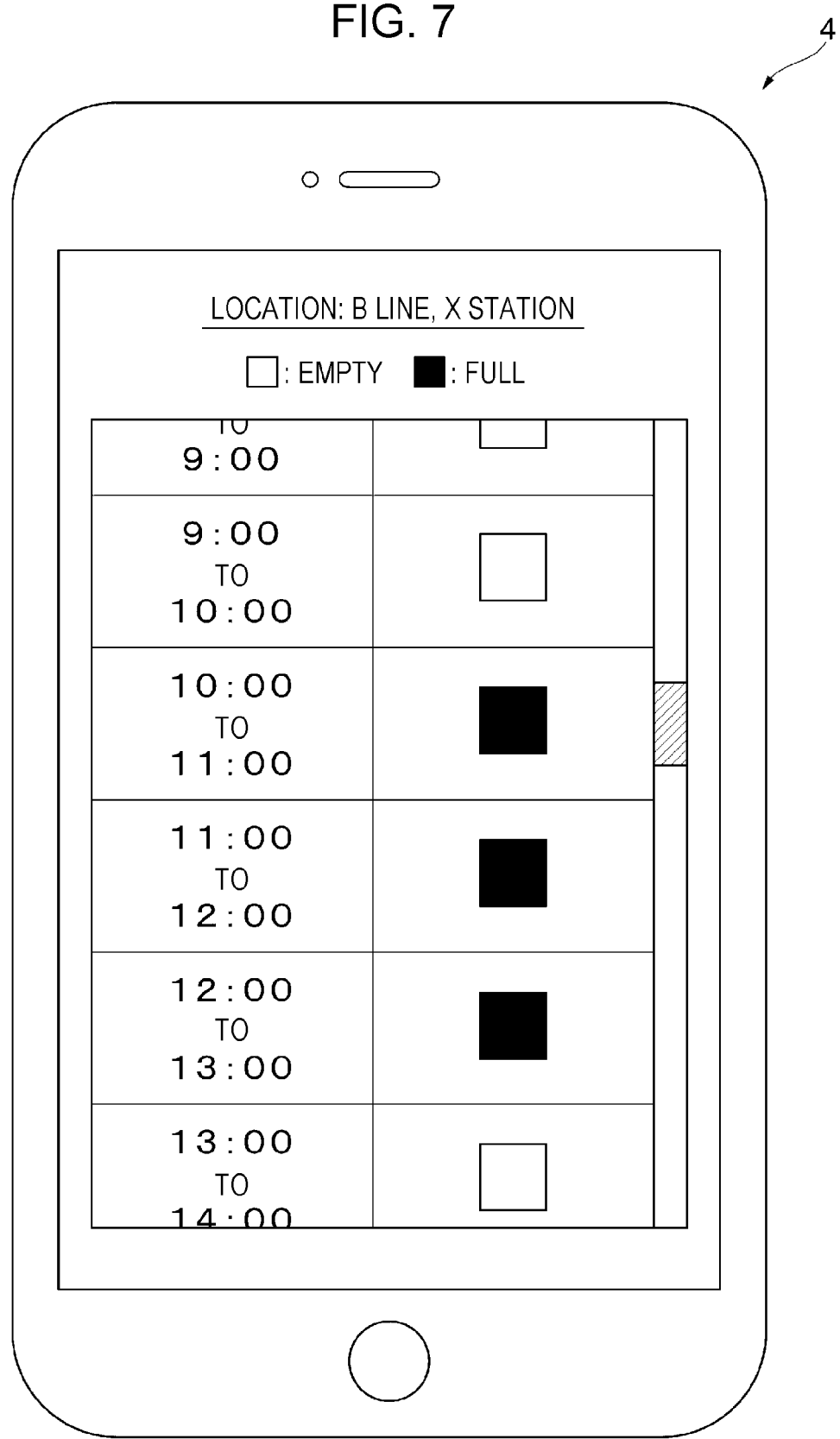
FIG. 7 is a diagram illustrating another example of a display screen displayed on the user terminal.

When an installation location is selected, the occupancy status at the selected installation location is displayed for individual time slots, as illustrated in FIG. 7 (a diagram illustrating another example of a display screen displayed on the user terminal 4).

The user performs an operation on the display screen to specify a reservation period. Additionally, the user presses a confirmation button (not illustrated).

In response, the space management server 5 performs a reservation confirmation process.

Specifically, after receiving information about the installation location of the booth 80 and the reservation period, the space management server 5 registers information about the installation location and the reservation period in the information DB (see FIG. 1), and performs a reservation confirmation process.

Thereafter, the reservation confirmation result is transmitted to the user terminal 4 to notify the user making the reservation.

Figure 8:
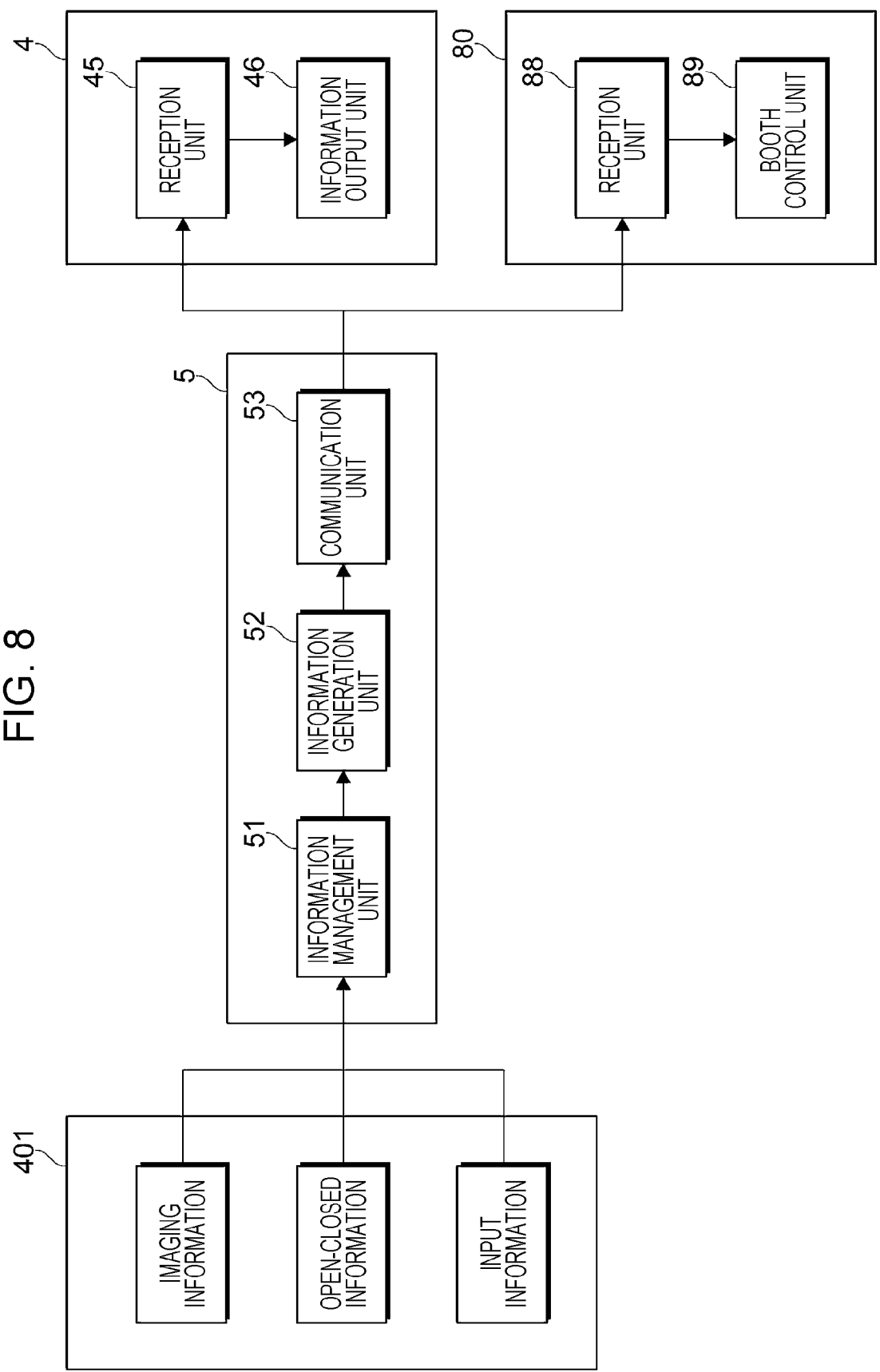
FIG. 8 is a diagram illustrating function units included in each of the booth, the space management server, and the user terminal provided in the information processing system.

FIG. 8 is a diagram illustrating function units included in each of the booth 80, the space management server 5, and the user terminal 4 provided in the information processing system 1. Note that in FIG. 8, only function units related to locking the door 22 provided in the booth 80 are illustrated.

In the exemplary embodiment, a sensor unit 401 is provided. More specifically, in the exemplary embodiment, the booth 80 is provided with devices such as the interior imaging device 24, the exterior imaging device 38, and the open/close sensor S1 as described above, and these devices form the sensor unit 401. Also, in the exemplary embodiment, the input device 204 provided in the user terminal 4 (see FIG. 5) also functions as the sensor unit 401.

In the exemplary embodiment, various information is obtained by the sensor unit 401, such as imaging information, which is information obtained by taking an image of the interior or exterior of the booth 80, and open-closed information, which is information about the open or closed state of the door 22. Also, input information which is information input by the user through the user terminal 4 is obtained by the sensor unit 401.

In the exemplary embodiment, the various obtained information is transmitted to the space management server 5.

The space management server 5 is provided with an information management unit 51, an information generation unit 52, and a communication unit 53.

The information management unit 51 acquires the information obtained by the sensor unit 401. In other words, the information management unit 51 acquires information transmitted from the booth 80 and the user terminal 4.

The information generation unit 52 generates control information used to control the booth 80 and the user terminal 4. The information generation unit 52 also generates screen information for a screen to be displayed in the booth 80 or on the user terminal 4, and audio information for audio to be output in the booth 80 or on the user terminal 4.

The communication unit 53 transmits the information generated by the information generation unit 52 to the user terminal 4 and the booth 80.

Here, these function units included in the space management server 5 are achieved by causing the CPU 111 (see FIG. 4) as one example of a processor to execute a program stored in the ROM 112, the hard disk drive 102, or the like.

In other words, in the exemplary embodiment, the processes described hereinafter that the space management server 5 executes are performed by the CPU 111.

The user terminal 4 is provided with a reception unit 45 and an information output unit 46.

The reception unit 45 receives information transmitted from the space management server 5. The information output unit 46 outputs information received by the reception unit 45 to the display device 205 (see FIG. 5) or a speaker (not illustrated).

With this arrangement, in the exemplary embodiment, a screen based on information transmitted from the space management server 5 is displayed on the user terminal 4. Also, audio based on information transmitted from the space management server 5 is output from the user terminal 4.

Here, the reception unit 45 and the information output unit 46 included in the user terminal 4 are achieved by causing the CPU 211 provided in the user terminal 4 (see FIG. 5) to execute a program stored in the ROM 212 or the like.

Also, in the exemplary embodiment, the booth 80 is provided with a reception unit 88 and a booth control unit 89, as illustrated in FIG. 8.

The reception unit 88 receives information transmitted from the space management server 5. The booth control unit 89 controls the components of the booth 80 on the basis of information received by the reception unit 88.

Although omitted from illustration, the booth 80 is also provided with a CPU, ROM, and RAM, such that the reception unit 88 and the booth control unit 89 provided in the booth 80 are achieved by causing the CPU to execute a program stored in the ROM or the like.

The process executed by the information processing system 1 will be described specifically.

In the exemplary embodiment, as a basic process, the door 22 of the booth 80 is locked automatically in the case where the door 22 is closed. More specifically, in the exemplary embodiment, when the open/close sensor S1 detects that the door 22 of the booth 80 is closed, the electronic lock 22C activates to lock the door 22 automatically.

Also, in the exemplary embodiment, a biasing mechanism (not illustrated) that biases the door 22 in the direction of closing the door 22 is provided, such that the door 22 is closed automatically. Note that the biasing mechanism may be achieved with a known configuration.

In the exemplary embodiment, basically, the door 22 is locked automatically when the door 22 is closed, as described above.

On the other hand, in the exemplary embodiment, the door 22 is not locked in the case where a predetermined condition is satisfied when the door 22 is closed.

Specifically, in the exemplary embodiment, the door 22 is not locked in the case where the door 22 is closed inside the reservation period of the booth 80, for example.

More specifically, in the exemplary embodiment, the information generation unit 52 of the space management server 5 outputs a signal giving an instruction to lock the door 22, but in the case where the door 22 is closed inside the reservation period of the booth 80, the information generation unit 52 does not output a signal giving an instruction to lock the door 22.

In the exemplary embodiment, when the open/close sensor S1 detects that the door 22 of the booth 80 is closed, the information generation unit 52 outputs a signal giving an instruction to lock the door 22. With this arrangement, the electronic lock 22C activates, and the door 22 is locked.

In contrast, in the exemplary embodiment, in the case where the door 22 is closed inside the reservation period of the booth 80, the information generation unit 52 does not output a signal giving an instruction to lock the door 22.

With this arrangement, in the exemplary embodiment, even if the door 22 is closed after the user inside the booth 80 exits the booth 80, the booth 80 is not locked if the current time is inside the reservation period.

Consequently, in this case, the user is able to re-enter the booth 80 even if the user exits the booth 80 without taking the user terminal 4.

In the exemplary embodiment, the door 22 is unlocked using the user terminal 4, and therefore if the user exists the booth 80 without taking the user terminal 4, the user is no longer able to unlock and re-enter the booth 80.

In contrast, in the case where the booth 80 is not locked even if the user exits the booth 80 like in the exemplary embodiment, the user is able to re-enter the booth 80 even if the user exists the booth 80 without taking the user terminal 4.

FIG. 9 is a diagram illustrating information stored in the information DB provided in the space management server 5.

In the exemplary embodiment, the information DB is provided in the space management server 5 as described above. In the information DB, information about a reservation period, the location of the booth 80, a flag indicating whether the user has entered the booth 80, a flag indicating whether the user is inside the booth 80, and a flag indicating whether the user terminal 4 is present inside the booth 80 is registered for each booth 80.

In the case where the door 22 of the booth 80 is closed, the information generation unit 52 ascertains the current time when the door 22 is closed. Additionally, in the case where the current time is inside the reservation period, the information generation unit 52 does not output a signal giving an instruction to lock the door 22. With this arrangement, the booth 80 is not locked in this case.

Note that even if the door 22 is not locked in this way, the door 22 preferably is locked after the reservation period of the booth 80 ends.

In this case, when the reservation period of the booth 80 ends, the information generation unit 52 outputs a control signal giving an instruction to lock the booth 80. In other words, the information generation unit 52 outputs a control signal giving an instruction to lock the booth 80 when a reservation end time of the booth 80 is reached.

With this arrangement, the booth control unit 89 activates the electronic lock 22C (see FIG. 2) to lock the door 22.

Also, as another process, it may be configured such that the door 22 is not locked in the case where the door 22 is closed while the booth 80 is in an unoccupied state, for example.

More specifically, in this case, if the human sensor 25 (see FIG. 2) does not detect the presence of a person when the door 22 is closed, the information generation unit 52 does not output a control signal giving an instruction to lock the door 22.

Consequently, the user is able to re-enter the booth 80 even if the user exits the booth 80 without taking the user terminal 4.

Also, as another process, it may be configured such that the door 22 is locked in the case where the door 22 is closed while the booth 80 is in an unoccupied state outside the reservation period of the booth 80.

Also, as another process, it may be configured such that even if the current time is inside the reservation period of the booth 80, the door 22 is locked in the case where a predetermined amount of time has elapsed since the user exited the booth 80.

In the exemplary embodiment, basically, the door 22 is not locked in the case where the door 22 is closed inside the reservation period of the booth 80, as described above. On the other hand, even if the current time is inside the reservation period, the door 22 may be locked in the case where a predetermined amount of time has elapsed since the door 22 was closed while the booth 80 is in an unoccupied state.

Also, as another process, it may be configured such that the door 22 is locked in the case where the reservation end time of the booth 80 is reached while the booth 80 is in an unoccupied state.

Figure 13:
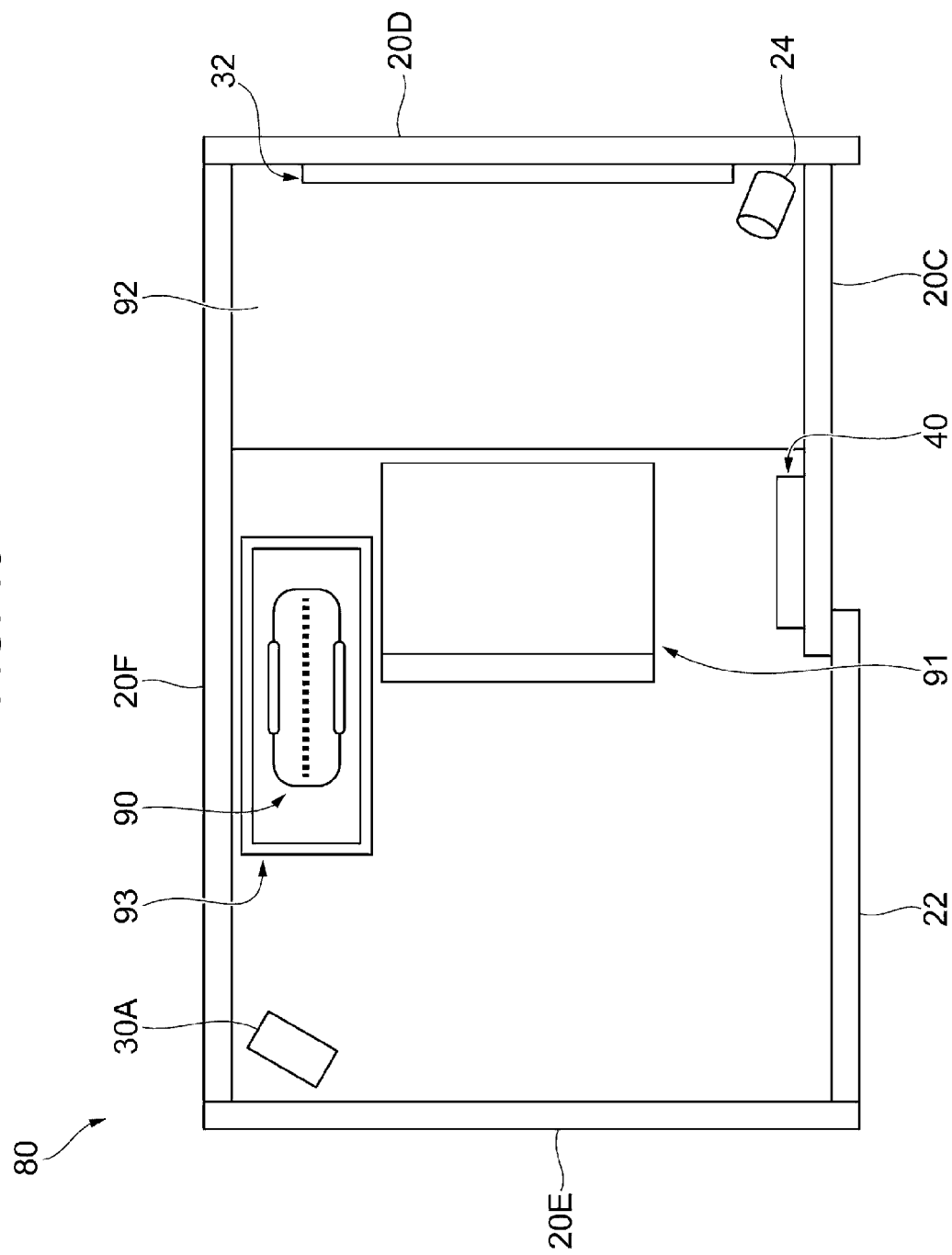
FIG. 13 is a diagram illustrating an example of a state inside the booth.

Otherwise, as illustrated in FIG. 13 (a diagram illustrating an example of a state inside the booth 80), it may also be configured such that the door 22 is not locked in the case where the door 22 is closed in a state in which the belongings of the user who uses the booth 80 are inside the booth 80. Here, this example illustrates an exemplary case where the door 22 is closed in a state in which a bag 90 of the user who uses the booth 80 is contained in the baggage container 93 installed in the booth 80. In this case, it may be configured such that the door 22 is not locked.

Specifically, in this case, the information generation unit 52 analyzes an image acquired by the interior imaging device 24, and determines whether or not the belongings of the user who uses the booth 80 are inside the booth 80.

More specifically, the information generation unit 52 compares an image acquired by the interior imaging device 24 before the reservation period to an image acquired by the interior imaging device 24 after the reservation period, and determines whether or not the belongings of the user who uses the booth 80 are inside the booth 80.

Additionally, in the case where the door 22 is closed in the state in which the belongings are inside the booth 80, the information generation unit 52 does not generate a control signal giving an instruction to lock the door 22. Consequently, a user who briefly exits the booth 80 is able to re-enter the booth 80 in this case too.

Otherwise, the information generation unit 52 may be configured to lock the door 22 in the case where the door 22 is closed while the user is inside the booth 80, even in the case where the belongings of the user are inside the booth 80.

In the exemplary embodiment, the door 22 is locked automatically as a basic process, as described above.

The information generation unit 52 may be configured to execute the basic process and lock the door 22 in the case where the user is inside the booth 80, even in the case where the belongings of the user are inside the booth 80.

Otherwise, the information generation unit 52 may be configured not to lock the door 22 even if the opened door 22 is closed while the user is outside the booth 80 and not carrying the user terminal 4.

More specifically, for example, in the case where the opened door 22 is closed while the user terminal 4 is inside the booth but the user is not present inside the booth 80, the information generation unit 52 generate and output to the booth 80 control information such that the door 22 is not locked.

In this case, the information generation unit 52 determines whether or not the user terminal 4 is inside the booth 80 by analyzing an image acquired by the interior imaging device 24, for example.

Also, in this case, the information generation unit 52 determines whether or not the user is present inside the booth 80 by analyzing an image acquired by the interior imaging device 24 or by obtaining a detection result from the human sensor 25, for example.

Figure 14:
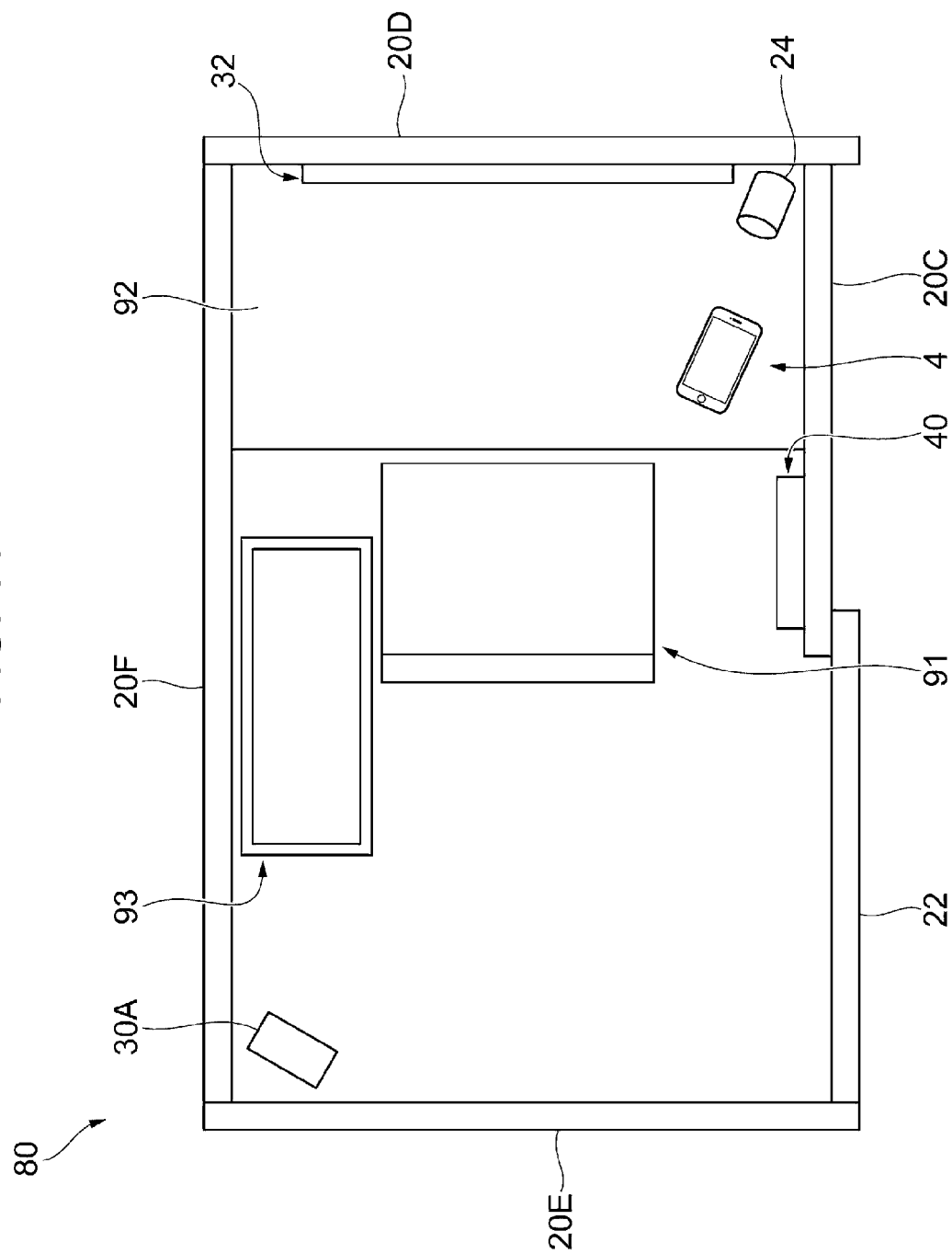
FIG. 14 is a diagram illustrating an example of a state inside the booth.

Additionally, as illustrated in FIG. 14 (a diagram illustrating an example of a state inside a booth), the information generation unit 52 determines not to lock the door 22 in the case where the door 22 is closed while the user terminal 4 is inside the booth 80 and the user is not present inside the booth 80. Also, in this case, the information generation unit 52 generates and outputs to the booth 80 control information such that the door 22 is not locked.

Consequently, in this case as well, the user is able to re-enter the booth 80 even if the user exits the booth 80 without taking the user terminal 4.

In the exemplary embodiment, in the case where the user terminal 4 is inside the booth 80, the information generation unit 52 registers information indicating that the user terminal 4 is inside the booth 80 in the information DB, as indicated by the sign 10A in FIG. 9.

The information generation unit 52 determines not to lock the door 22 in the case where the door 22 is closed in the state in which information indicating that the user terminal 4 is inside the booth 80 is registered in the information DB and the user is not present inside the booth 80. Also, in this case, the information generation unit 52 generates and outputs to the booth 80 control information such that the door 22 is not locked.

Also, as another process, in the case where the door 22 is opened from the inside of the booth 80 and then closed, the information generation unit 52 may generate and output to the booth 80 control information such that the door 22 is not locked.

Consequently, in this case as well, the door 22 is not locked even if the user briefly exits the booth 80 and returns to the booth 80, and the user is able to re-enter the booth 80.

Here, the determination of whether or not the door 22 is opened from the inside of the booth 80 is achieved by detecting whether or not the electronic lock 22C is operated by the user from the inside of the booth 80, for example.

More specifically, in the exemplary embodiment, the electronic lock 22C is provided with the inside key 603C operated manually by the user, as illustrated in FIG. 10, and in the case where the inside key 603C is operated and the door 22 is opened, the information generation unit 52 determines that the door 22 has been opened from the inside of the booth 80.

Otherwise, for example, the information generation unit 52 may analyze an image obtained by the interior imaging device 24 to determine whether or not the door 22 has been opened from the inside of the booth 80.

Additionally, in the case of determining that the door 22 has been opened from the inside of the booth 80, the process is configured such that the door 22 is not locked even if closed.

Note that, like the cases described above, this case may also be configured such that the door 22 is locked when a predetermined amount of time has elapsed since the door 22 opened from the inside is closed, or when the reservation end time of the booth 80 is reached.

Conversely, in the case where the door 22 is opened from the outside of the booth 80 and then closed, the information generation unit 52 may generate and output control information such that the door 22 is locked.

In the case where the door 22 is opened from the outside of the booth 80 and then closed, it is anticipated that the user has entered the booth 80, and in this case, a situation where the user is unable to re-enter the booth 80 is unlikely to occur even if the door 22 is locked.

Here, the determination of whether or not the door 22 is opened from the outside of the booth 80 is achieved by providing a sensor that detects user contact with the handle 22A (see FIG. 2) and making the determination on the basis of a detection result from the sensor, for example.

In the case where the door 22 is opened in a state in which the user's hand touches the handle 22A, the information generation unit 52 determines that the door 22 has been opened from the outside of the booth 80.

Also, in this case, the information generation unit 52 generates and outputs to the booth 80 control information such that the door 22 is locked. With this arrangement, when the door 22 is closed, the door 22 is also locked.

Note that besides the above, the determination of whether or not the door 22 is opened from the outside of the booth 80 may also be achieved by analyzing an image obtained by the exterior imaging device 38 (see FIG. 2).

Otherwise, as also described above, the information generation unit 52 may generate and output such that the door 22 is locked when the reservation end time of the booth 80 is reached while the door 22 is not in a locked state, or when the door 22 continues to be in a non-locked state for more than a predetermined amount of time.

In the exemplary embodiment, the door 22 is not locked in cases such as when the door 22 opened from the inside of the booth 80 is closed, and situations may occur in which the door 22 remains in an unlocked state.

In contrast, if control information causing the door 22 to be locked is generated and output as described above, it is possible to keep the door 22 from remaining in an unlocked state for long periods of time.

Second Exemplary Embodiment

Next, a second exemplary embodiment will be described.

In the second exemplary embodiment, the information generation unit 52 outputs predetermined information in the case where the user inside the booth 80 attempts to exit the booth 80 without taking the user terminal 4 as an example of portable equipment.

Specifically, in the case where the user inside the booth 80 attempts to exit the booth 80 without taking the user terminal 4, the information generation unit 52 generates and outputs information for reminding the user to take the user terminal 4.

More specifically, the information generation unit 52 generates and outputs control information such that the door 22 does not open as the information for reminding the user to take the user terminal 4, for example.

If the information generation unit 52 outputs the control information, the user is unable to exit the booth 80 even if the user attempts to exit the booth 80.

More specifically, if the information generation unit 52 outputs the control information, the booth control unit 89 outputs a signal to the electronic lock 22C (see FIG. 10) such that the rotation mechanism 603 provided in the electronic lock 22C does not move. More specifically, the booth control unit 89 activates the lock mechanism 603E provided in the electronic lock 22C so that the inside key 603C provided in the electronic lock 22C does not move.

With this arrangement, the user becomes unable to unlock the door 22 and exit the booth 80.

In this case, there is an increased probability that the user will notice that he or she is not carrying the user terminal 4 compared to the case where the user inside the booth 80 is free to exit the booth 80.

Note that according to the above, the door 22 is kept from opening by causing the inside key 603C provided in the electronic lock 22C not to move, but otherwise, the booth control unit 89 may also activate another electronic lock provided separately from the electronic lock 22C to keep the door 22 from opening, for example.

Also, as another example, the information generation unit 52 may generate and output information for instructing the user to take the user terminal 4 as the information for reminding the user to take the user terminal 4.

In the exemplary embodiment, when the information for instructing the user to take the user terminal 4 is output, the booth control unit 89 controls the monitor 32 and the speaker 30A.

With this arrangement, as illustrated in FIG. 15 (a diagram illustrating a display example on the monitor 32), for example, information for instructing the user to take the user terminal 4 is displayed on the monitor 32. Additionally, sound or speech for instructing the user to take the user terminal 4 is output from the speaker 30A, for example.

With this arrangement, there is an increased probability that the user will take the user terminal 4 in this case too.

Note that the information for instructing the user to take the user terminal 4 may also be output to the user terminal 4, such that the information for instructing the user to take the user terminal 4 is output from the display device 205 (see FIG. 5) and a speaker provided in the user terminal 4.

Third Exemplary Embodiment

In the exemplary embodiment, as described above, when a user on the outside of the booth 80 wants to unlock the booth 80, the user operates the user terminal 4 to give an unlock instruction, and the door 22 is unlocked.

In other words, in the exemplary embodiment, the door 22 is unlocked in the case where a single condition is satisfied, the single condition being that the unlock instruction is issued from the user terminal 4 carried by the user.

In contrast, in the third exemplary embodiment, after this predetermined first condition is satisfied and the door 22 is unlocked, the door 22 may also be unlocked in the case where a second condition different from the first condition is satisfied.

In the third exemplary embodiment, the case where the unlock instruction is given by the user terminal 4 carried by the user corresponds to the case in which the first condition is satisfied. If the unlock instruction is given by the user terminal 4 and the first condition is satisfied, the door 22 is unlocked.

Additionally, in the third exemplary embodiment, after the first condition is satisfied and the door 22 is unlocked, the door 22 may also be unlocked in the case where a second condition other than the first condition of the unlock instruction from the user terminal 4 is satisfied.

In other words, in the third exemplary embodiment, after the door 22 is unlocked a first time, the door 22 may also be unlocked in the case where another condition other than the condition of the unlock instruction from the user terminal 4 is satisfied.

Here, an example is given in which the second condition is the case where user information, which is information obtained from the user on the outside of the booth 80, satisfies a predetermined condition.

In this case, after the first condition is satisfied and the door 22 is unlocked, the door 22 may also be unlocked if the user information obtained from the user satisfies a predetermined condition.

Here, information obtained from the body of the user on the outside of the booth 80 is given as an example of the user information.

In this case, after the first condition is satisfied and the door 22 is unlocked, the door 22 may also be unlocked if information obtained from the body of the user on the outside of the booth 80 satisfies a predetermined condition.

In other words, after the first condition is satisfied and the door 22 is unlocked, the door 22 may be unlocked not only in the case where the first condition is satisfied again, but also in the case where information obtained from the body of the user on the outside of the booth 80 satisfies a predetermined condition.

Here, information about the face of a user obtained by taking an image of the face of the user (hereinafter referred to as "first face information") is given as an example of the information obtained from the body of the user on the outside of the booth 80.

Additionally, in the exemplary embodiment, the door 22 is unlocked in the case where the first face information satisfies a predetermined condition.

Specifically, in the exemplary embodiment, the door 22 is unlocked in the case where the first face information matches face information obtained when the user is inside the booth 80 (hereinafter, "second face information").

More specifically, in the third exemplary embodiment, after the first condition is satisfied and the door 22 is unlocked, the user enters the booth 80, and after the user enters the booth 80, the second face information is acquired.

More specifically, an image of the user is taken by the interior imaging device 24 (see FIG. 3), and the second face information of the user inside the booth 80 is obtained.

Additionally, in the exemplary embodiment, the door 22 is unlocked in the case where the first face information obtained from the user who later exits the booth 80 matches the second face information.

More specifically, the door 22 is unlocked in the case where the first face information obtained by taking an image of the user on the outside of the booth 80 with the exterior imaging device 38 (see FIG. 2) matches the second face information above.

In this case as well, the user is able to re-enter the booth 80 even if the user has exited the booth 80 without taking the user terminal 4.

Figure 16:
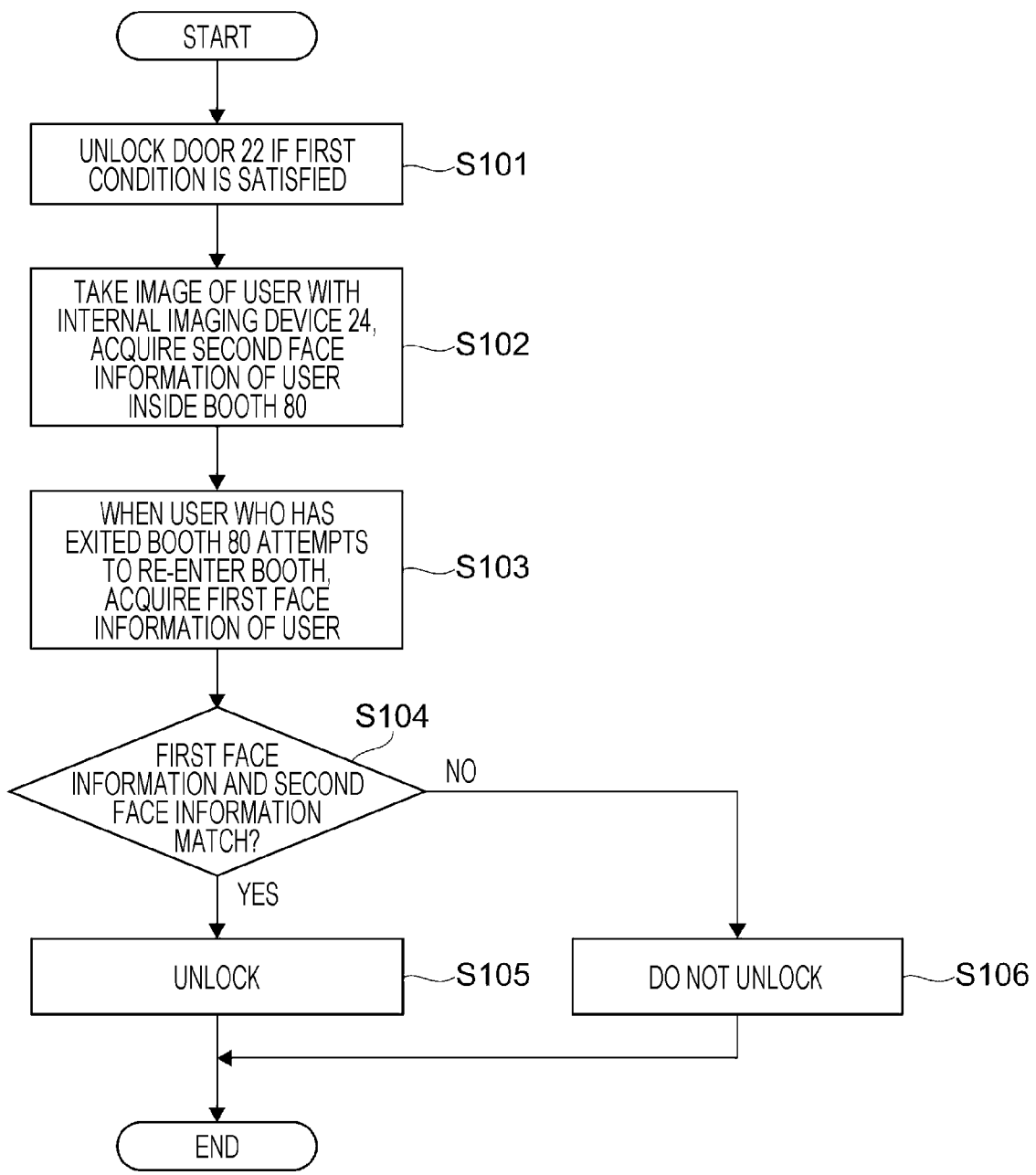
FIG. 16 is a flowchart illustrating the flow of processes executed in an exemplary embodiment.

More specifically, in the third exemplary embodiment, the series of processes illustrated in FIG. 16 (a flowchart illustrating the flow of processes executed in the exemplary embodiment) is executed.

First, in the exemplary embodiment, the first condition is satisfied and the door 22 is unlocked (step S101). Next, in the exemplary embodiment, an image of the user is taken by the interior imaging device 24, and the second face information of the user inside the booth 80 is acquired (step S102).

Figure 17:
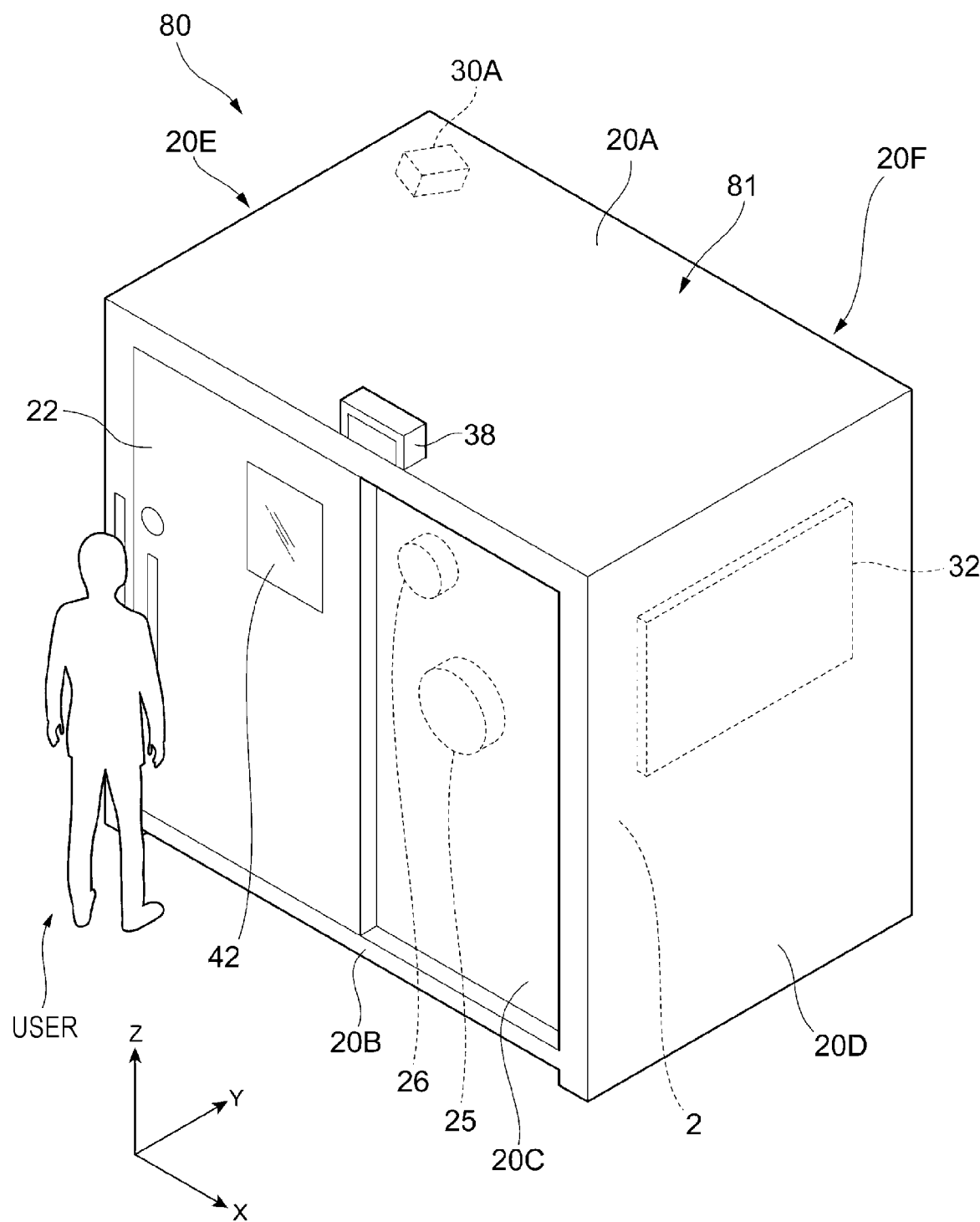
FIG. 17 is a diagram illustrating a user on the outside of the booth.

Thereafter, in the exemplary embodiment, as illustrated in FIG. 17 (a diagram illustrating a user on the outside of a booth), when the user who has exited the booth 80 attempts to re-enter the booth 80, face information of the user, specifically the first face information, is acquired (step S103).

Additionally, in the exemplary embodiment, it is determined whether or not the first face information and the second face information match (step S104), and in the case where the first face information and the second face information match, the door 22 is unlocked (step S105). On the other hand, in the case where the first face information and the second face information do not match, the door 22 is not unlocked (step S106).

In the exemplary embodiment, after the first condition is satisfied and the door 22 is unlocked, the second face information that is treated as an element of the second condition is acquired.

In other words, in the exemplary embodiment, the second face information that is treated as an element of the second condition is not acquired before the first condition is satisfied. In this case, in the exemplary embodiment, the second condition is not satisfied before the first condition is satisfied.

Here, the second face information is also obtainable by having the user take an image of him- or herself using his or her own user terminal 4.

However, in this case, a large amount of second face information is registered in the space management server 5 or the like irrespectively of whether or not the face information is actually used, and a large amount of personal information is collected in the space management server 5 or the like irrespectively or whether or not the personal information is actually used. From the standpoint of preserving privacy, it is not desirable to collect a large amount of personal information in this way.

In contrast, if the second face information that is treated as an element of the second condition is configured to be obtained in the case where the first condition is satisfied and the door 22 is unlocked as described above, it is possible to enable a user who has exited the booth 80 to re-enter the booth 80 while also reducing the amount of personal information that is collected.

Note that although the above describes the case of acquiring face information as the user information, the user information is not limited to the above, and for example, vein information about a user's vein pattern or fingerprint information about a user's fingerprint may also be acquired as the user information.

In this case, a scanner that reads a user's vein pattern or a scanner that reads a user's fingerprint is installed inside the booth 80, for example. Additionally, when the user enters the booth 80, vein information or fingerprint information is acquired from the user, and the acquired vein information or fingerprint information is registered.

In addition, when a user who briefly exits the booth 80 returns to the booth 80, the information acquisition device 29 (see FIG. 2) is used to acquire vein information or fingerprint information from the user. The door 22 is unlocked in the case where the registered vein information or fingerprint information and the acquired vein information or fingerprint information match.

Otherwise, input information such as a password input by the user is also an example of user information that is obtained from the user on the outside of the booth 80.

Figure 18:
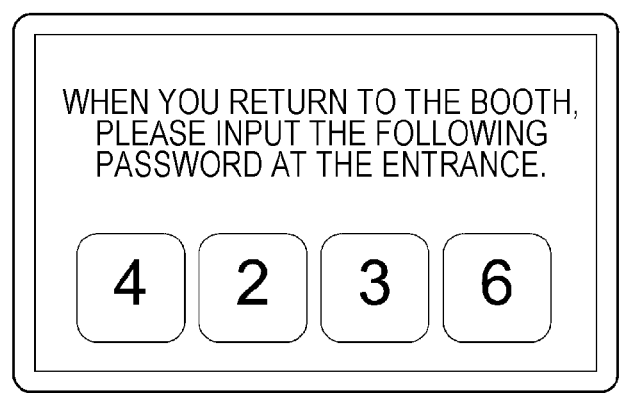
FIG. 18 is a diagram illustrating a display example on a monitor.

In this case, when the user is inside the booth 80, information such as a password is presented to the user, and the user is instructed to memorize the information, for example. Specifically, as illustrated in FIG. 18 (a diagram illustrating a display example on the monitor 32), a password used when returning to the booth 80 is displayed on the monitor 32, for example.

Additionally, in this case, when the user who briefly exits the booth 80 attempts to re-enter the booth 80, the user is asked to input the presented information through the user terminal 4 or an information input device (not illustrated) installed on the booth 80.

In this case, the door 22 is unlocked if the information input by the user on the outside of the booth 80 matches the information that was presented inside the booth 80.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A booth comprising:
an openable door;
a first sensor, configured to detect presence of a user inside of the booth, wherein an unoccupied state of the booth is a detection of no presence of the user inside of the booth;
a second sensor, configured to detect closed state or open state of the door of the booth; and
a locking mechanism that locks the door,
wherein the booth is reservable;
the door is locked in a case where in response to a detection of the door being closed through the second sensor, and the door is not locked in a case where a predetermined condition is satisfied when the door is closed;
wherein the door is not locked in a case where in response to the detection of the door being closed through the second sensor and a detection of the booth being in while the booth is in the unoccupied state through the first sensor inside a reservation period of the booth,
the door is locked in a case where in response to a predetermined amount of time elapses from when the door is detected to be closed by the second sensor and the booth is detected to be in the unoccupied state through the first sensor inside the reservation period of the booth.

2. The booth according to claim 1, wherein the door is locked after the reservation period ends.

3. The booth according to claim 1, wherein the booth is reservable, and
the door is locked when a reservation end time of the booth is reached while the booth is in an unoccupied state.

4. The booth according to claim 1, wherein the door is not locked in a case where the door is closed while belongings of a user who uses the booth are inside the booth.

5. The booth according to claim 4, wherein even in the case where the belongings of the user are inside the booth, the door is locked if the user is inside the booth.

6. The booth according to claim 1, wherein the door is unlocked in a case where an unlock instruction is given by portable equipment carried by a user of the booth, and
the door is not locked in a case where the opened door is closed while the user not carrying the portable equipment is on an outside of the booth.

7. The booth according to claim 1, wherein the booth is reservable, and
the door is locked when a reservation end time of the booth is reached while the booth is not locked.

8. An information processing system that performs a process for a booth provided with a door that is unlocked on a basis of an instruction from portable equipment carried by a user, the information processing system comprising:
a processor configured to
output predetermined information in a case where the user inside the booth attempts to exit the booth without taking the portable equipment, and output control information such that the door is double locked as the information for reminding the user to take the portable equipment.

9. The information processing system according to claim 8, wherein
the processor is configured to output information for reminding the user to take the portable equipment as the predetermined information.

10. The information processing system according to claim 9, wherein
the processor is configured to output information for instructing the user to take the portable equipment as the information for reminding the user to take the portable equipment.

11. A non-transitory computer readable medium storing a program causing a computer to execute a process for a booth provided with a door that is unlocked on a basis of an instruction from portable equipment carried by a user, the process comprising:
outputting predetermined information in a case where the user inside the booth attempts to exit the booth without taking the portable equipment; and outputting control information such that the door is double locked as the information for reminding the user to take the portable equipment.

12. A booth comprising:
an openable door; and
an unlocking mechanism that unlocks the door, wherein
the door is unlocked in a case where a predetermined first condition is satisfied, and after the first condition is satisfied and the door is unlocked, the door is also unlocked in a case where a second condition different from the first condition is satisfied;
wherein the second condition is satisfied when a first face information matches a second face information, the second face information is acquired after unlocking of door based on the first condition and before unlocking of door based on the second condition by taking image of a user inside the booth through an interior imaging device of the booth, the first face information is acquired by taking image of the user while the user attempts to re-enter the booth from outside of the booth;
wherein the second condition is not satisfied before the first condition is satisfied.

13. The booth according to claim 12, wherein
the first condition is a case where an unlock instruction is given by portable equipment carried by a user, and the door is unlocked in the case where the unlock instruction is given by the portable equipment, and
after the unlock instruction is given by the portable equipment and the door is unlocked, the door is also unlocked in a case where a condition other than the condition of the unlock instruction from the portable equipment is satisfied.

\* \* \* \* \*